United States Patent
Koana (10) Patent No.: US 6,888,641 B2
(45) Date of Patent: May 3, 2005

(54) DESIGNATING AN IMAGE PROCESSING APPARATUS BASED ON LIMITED SELECTION CONDITIONS

(75) Inventor: Ryuzou Koana, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/088,737

(22) Filed: Jun. 2, 1998

(65) Prior Publication Data

US 2001/0048533 A1 Dec. 6, 2001

(30) Foreign Application Priority Data

Jun. 9, 1997 (JP) .............................................. 9-151357

(51) Int. Cl.⁷ .............................................. G06K 15/00
(52) U.S. Cl. ...................... 358/1.15; 358/1.13; 399/81; 399/77
(58) Field of Search ................. 358/1.1–1.9, 1.11–1.18; 345/705, 733, 734, 747, 748, 783, 805, 810, 823, 173, 531, 532, 205, 1.2; 399/77, 81

(56) References Cited

U.S. PATENT DOCUMENTS

| | | | |
|---|---|---|---|
| 5,036,361 A | * | 7/1991 | Filion et al. ................. 355/209 |
| 5,045,880 A | * | 9/1991 | Evanitsky et al. ......... 358/1.14 |
| 5,130,806 A | * | 7/1992 | Reed et al. ................... 358/296 |
| 5,187,750 A | * | 2/1993 | Behera .......................... 382/7 |
| 5,260,805 A | * | 11/1993 | Barrett ........................ 358/449 |
| 5,287,194 A | * | 2/1994 | Lobiondo .................... 358/296 |
| 5,467,434 A | * | 11/1995 | Hower, Jr. et al. ........ 358/1.15 |
| 5,579,447 A | * | 11/1996 | Salgado ...................... 358/1.9 |
| 5,580,177 A | * | 12/1996 | Gase et al. .................... 400/61 |
| 5,625,757 A | * | 4/1997 | Kageyama ................... 358/1.9 |
| 5,689,625 A | * | 11/1997 | Austin et al. ............... 358/1.15 |
| 5,754,744 A | * | 5/1998 | Matsumoto et al. ........ 358/1.13 |
| 5,819,015 A | * | 10/1998 | Martin et al. ............... 358/1.15 |
| 5,859,711 A | * | 1/1999 | Barry et al. ................. 358/296 |
| 5,918,988 A | * | 7/1999 | H.A.M. Van Oijen ........ 400/76 |
| 5,974,234 A | * | 10/1999 | Levine et al. ............... 358/1.15 |
| 6,081,342 A | * | 6/2000 | Nakai et al. ................ 358/1.16 |
| 6,088,120 A | * | 7/2000 | Shibusawa et al. ........ 358/1.15 |

* cited by examiner

*Primary Examiner*—King Y. Poon
(74) *Attorney, Agent, or Firm*—Fitzpatrick, Cella, Harper & Scinto (57) ABSTRACT

The present invention relates to a system having a computer and a plurality of printers connected to the computer. A printer selector selects a printer which can perform printing in the output form inputted by an operator through an input unit such as a keyboard or the like, based on print job data or printer data or the like. By inputting the output form, a printer having desired function e.g., printer capable of color printing or capable of both-sides printing and the like, is automatically selected.

12 Claims, 7 Drawing Sheets

WINDOW

| PRINTER NAME | PRINT-WAIT TIME |
|---|---|
| LBP - 730 | 3' 50" |
| LBP - 600 | 1' 30" |
| LBP - 300 | 5' 20" |
| | |
| | |
| | |

WINDOW

PRINTER NAME: LBP - 730

| PRINT JOB NAME | PRINT-WAIT TIME |
|---|---|
| PRINT JOB 1 | 20" |
| PRINT JOB 2 | 2' 10" |
| PRINT JOB 3 | 1' 20" |
| | |
| | |
| | |

DESIGNATING AN IMAGE PROCESSING APPARATUS BASED ON LIMITED SELECTION CONDITIONS

BACKGROUND OF THE INVENTION

The present invention relates to a data processing apparatus and method thereof, a memory medium and a program. More particularly, the present invention relates to a data processing apparatus comprising connection means for connecting the data processing apparatus with a plurality of image output apparatuses, a data processing method for executing an image output job by selecting one of the plurality of image output apparatuses, and a memory medium as well as a program for controlling the data processing.

Figure 7:
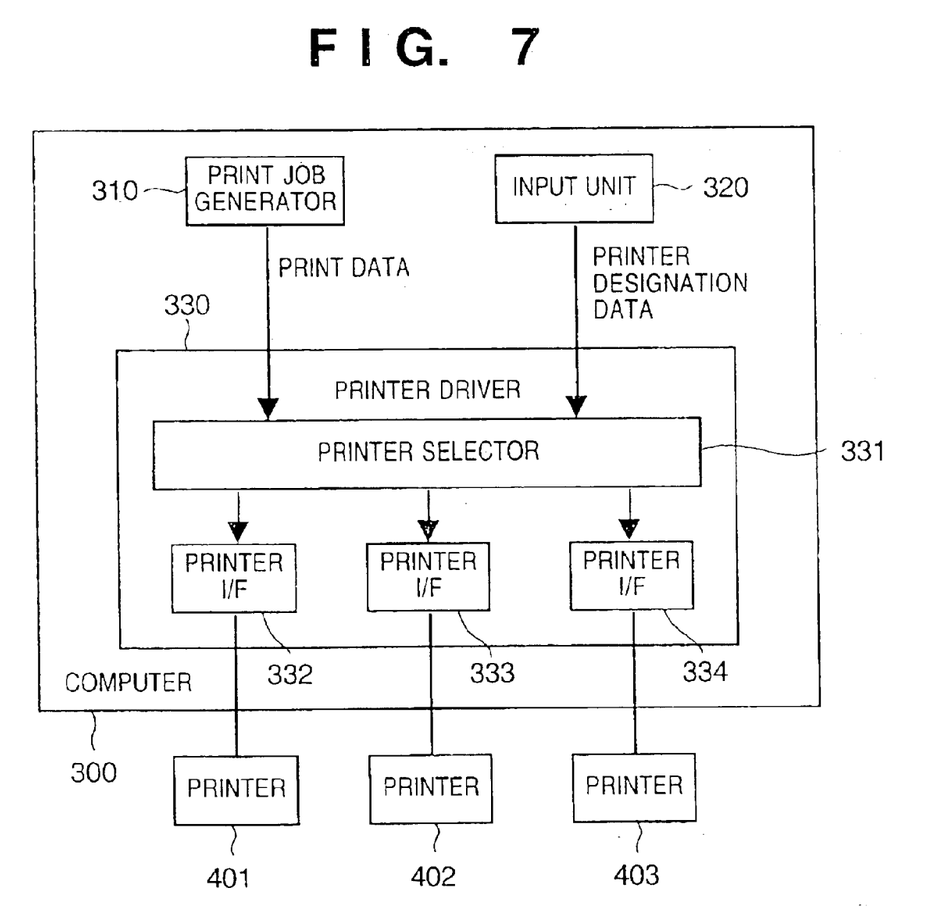
FIG. 7 is a block diagram showing a schematic construction of the conventional printer system.

Conventionally, to execute print processing in a system consisting of a computer and a plurality of printers, an operator has to select a printer which is suitable to contents of the print processing. FIG. 7 is a block diagram showing a schematic construction of the conventional printer system.

A printer driver 330 included in a computer 300 receives print data related to a print job generated by a print job generator 310, and also receives printer designation data through an input unit 320 such as a keyboard or mouse or the like. The print data is given in a predetermined form, e.g. PDL (Page Description Language). The printer designation data is information which designates one of the plurality of printers 401 to 403 connected to the computer 300, by a printer name or the like.

The printer driver 330, which has received the print data and printer designation data, selects a printer based on the printer designation data and transmits the print data to the selected printer.

In the above-described system, for instance, when an operator wishes to select a printer which can complete the execution of the print job in the shortest time period, the operator must first check contents of print jobs currently being executed or on standby with respect to each of the plurality of printers, then determine a printer which is predicted to complete execution of the print job in the shortest time period based on the contents, and select the determined printer by operating the input unit 320. Such operation is quite cumbersome and not desirable from the standpoint of efficient office work.

In addition, the above-described system requires inefficient operation in a case where an operator needs to select a printer based on its function, e.g., a printer capable of color printing, printer having high resolution, printer capable of both-sides printing and so forth. In this case, the operator must first check the function of each printer to determine a printer having the desired function and select the printer by operating the input unit 320.

SUMMARY OF THE INVENTION

The present invention has been made in consideration of the above situation, and has as its object to enable automatic selection of an image output apparatus suitable to the output form of an image, whereby reducing cumbersome operation by an operator.

A data processing apparatus (e.g., computer 100) according to the present invention, having connection means (e.g., network I/F 157) for being connected to a plurality of image output apparatuses (e.g., printers 201–203), comprises: obtain means (e.g., step S120) for obtaining an output form of an image; and selection means (e.g. step S140) for selecting an image output apparatus, which can perform output operation in the output form obtained by the obtain means, from the plurality of image output apparatuses (201–203) connected by the connection means.

It is preferable that the foregoing data processing apparatus further comprises job assigning means (e.g., step S160) for assigning an image output job (e.g., print job) to the image output apparatus selected by the selection means.

It is preferable in the foregoing data processing apparatus that the selection means selects an image output apparatus based on a content of the image output job in addition to the output form obtained by the obtain means.

It is preferable in the foregoing data processing apparatus that the selection means selects an image output apparatus based on the content of the image output job and a state of the image output job assigned to each of the image output apparatuses, in addition to the output form obtained by the obtain means.

It is preferable in the foregoing data processing apparatus that the selection means comprises confirm means for confirming function of each of the plurality of image output apparatuses connected by the connection means, and selects an image output apparatus having function to perform output operation in the output form obtained by the obtain means.

It is preferable in the foregoing data processing apparatus that the confirm means confirms the function of each of the plurality of image output apparatuses by referring to a memory storing, in advance, data indicative of the function of each of the plurality of image output apparatuses connected by the connection means.

It is preferable in the foregoing data processing apparatus that the confirm means confirms the function of each of the plurality of image output apparatuses by communicating with each of the plurality of image output apparatuses connected by the connection means.

It is preferable in the foregoing data processing apparatus that, in a case where the obtained output form designates to select an image output apparatus which completes execution of the image output job in a short time period, the selection means selects an image output apparatus which can perform output operation in the designated output form, based on the state of the image output job assigned to each of the image output apparatuses and the content of the image output job.

It is preferable that the foregoing data processing apparatus further comprises display means for displaying a message regarding an execution state of the image output job assigned to each of the plurality of image output apparatuses connected by the connection means.

It is preferable in the foregoing data processing apparatus that, in a case where the obtained output form designates to select an image output apparatus capable of color image output, the selection means confirms the function of each of the plurality of image output apparatuses connected by the connection means and selects an image output apparatus which can perform output operation in the designated output form.

It is preferable in the foregoing data processing apparatus that, in a case where the obtained output form designates to select a printer capable of both-sides printing, the selection means confirms the function of each of the plurality of image output apparatuses connected by the connection means and selects a printer serving as an image output apparatus which can perform printing in the designated output form.

It is preferable in the foregoing data processing apparatus that, in a case where a size of an output image is designated by the output form, the selection means confirms the function of each of the plurality of image output apparatuses connected by the connection means and selects an image output apparatus which can perform output operation in the designated output form.

It is preferable in the foregoing data processing apparatus that, in a case where there are plural image output apparatuses which can perform output operation in the output form obtained by the obtain means, the selection means selects one of the plural image output apparatuses based on priorities set in advance.

It is preferable in the foregoing data processing apparatus that, in a case where there are plural image output apparatuses which can perform output operation in the output form obtained by the obtain means, the selection means allows an operator to select one of the plural image output apparatuses.

It is preferable in the foregoing data processing apparatus that, in a case where the output form obtained by the obtain means includes plural output forms, the selection means selects an image output apparatus which can perform output operation in all the output forms.

Furthermore, an image output system according to the present invention is characterized by comprising the above-described data processing apparatus and a plurality of image output apparatuses connected to the data processing apparatus by the connection means.

Still further, a data processing method, according to the present invention, for executing an image output job by selecting one of a plurality of image output apparatuses, comprises the steps of: obtaining an output form of an image; and selecting an image output apparatus, which can perform output operation in the output form obtained in the obtaining step, from the plurality of selectable image output apparatuses.

It is preferable that the foregoing data processing method further comprises the step of assigning the image output job to the image output apparatus selected in the selecting step.

Still further, a memory medium according to the present invention is a memory medium storing program codes for controlling a data processing apparatus which includes connection means for being connected to a plurality of image output apparatuses, for causing the data processing apparatus to operate as an apparatus comprising: obtain means for obtaining an output form of an image; and selection means for selecting an image output apparatus, which can perform output operation in the output form obtained by the obtain means, from the plurality of image output apparatuses connected by the connection means.

It is preferable that the foregoing memory medium causes the data processing apparatus to operate as an apparatus comprising job assigning means for assigning an image output job to the image output apparatus selected by the selection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENT

Preferred embodiment of the present invention will be described in detail in accordance with the accompanying drawings.

Figure 1:
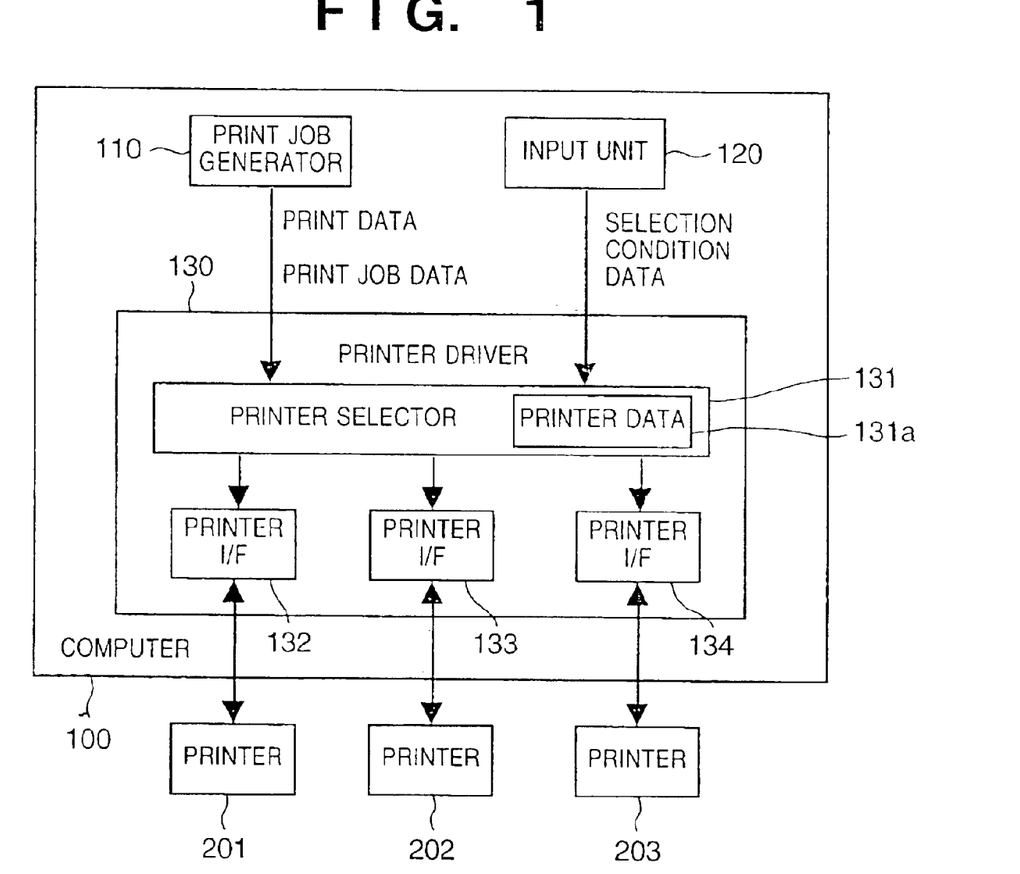
FIG. 1 is a block diagram showing the construction of a printer system according to a preferred embodiment of the present invention.

FIG. 1 is a block diagram showing the construction of a printer system according to the preferred embodiment of the present invention. This system comprises a computer 100 and a plurality of printers 201 to 203 connected to the computer 100.

The computer 100 includes a print job generator 110 (e.g., application program) which generates print jobs, an input unit 120 such as a keyboard or mouse or the like, and a printer driver 130.

The printer driver 130 includes printer interface units (printer I/F) 132 to 134, respectively connected to the plurality of printers 201 to 203, and a printer selector 131 which selects a printer to execute a print job based on necessary data on the print job data which is supplied by the print job generator 110, selection condition data inputted by an operator through the input unit 120, printer data 131a related to the function of each of the printers, data related to a print execution state of print jobs assigned to respective printers.

Herein, the print job data is information related to a print job, which is considered when the printer driver 130 selects a printer. Examples of print job data are the total number of pages of the print job, file size, paper size and so on.

The selection condition data, which is designated by an operator, is information related to an output form (requirement) considered by the printer driver 130 in order to select a printer. Examples of the selection condition data are the printer which completes execution of a print job in the shortest time period, printer capable of color printing, printer capable of both-sides printing, printer capable of using the print paper size designated by the print job and so on.

The printer data 131a may be set, in advance, in the internal portion e.g., printer selector 131 or the like, of the printer driver. Alternatively, the printer driver 130 may obtain printer data from each of the printers through respective printer I/F units at the time of system start-up. Alternatively, printer data may be prepared by other means. Examples of the printer data 131a are the printer name, manufacturer's name of the printer, printing method (e.g., ink-jet printing method, electrophotographic printing method), whether or not the printer has a color printing function, printing speed (e.g., printing time per page), printable paper sizes, resolution, interpretable page description languages and so on.

Figure 2:
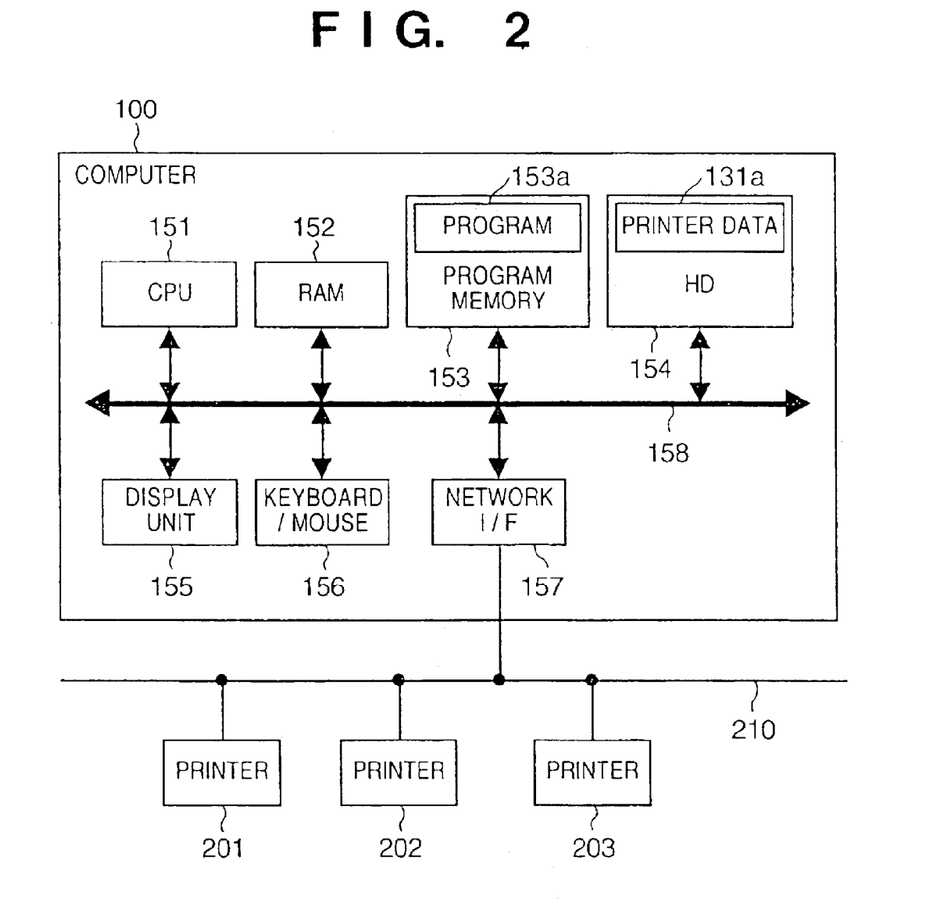
FIG. 2 is a block diagram showing the hardware structure of the system shown in FIG. 1.

FIG. 2 is a block diagram showing the hardware structure of the system shown in FIG. 1. The computer 100 includes a CPU 151, RAM 152, program memory 153, hard disk (HD) 154, display unit 155, keyboard/mouse 156 and network I/F unit 157, all of which are connected by a CPU bus 158.

In the program memory 153, a program 153*a* is stored for enabling the computer 100 to operate as an apparatus comprising the print job generator 110, input unit 120 and printer driver 130. The program memory 153 can be constructed by a floppy disk, hard disk, CD-ROM and other memory media. The program memory 153 itself, storing the program 153*a*, constitutes the present invention. The program 153*a* itself constitutes a statutory invention.

In the hard disk 154, the aforementioned printer data 131*a* is stored. Note that, as described above, it is also effective that the printer driver obtains printer data 131*a* from each of the printers through the network I/F unit 157 at the time of system start-up.

Herein, corresponding relationships between components shown in FIG. 1 and components shown in FIG. 2 are described. The print job generator 110 corresponds to the program 153*a*; input unit 120 corresponds to the keyboard/mouse 156 and program 153*a*; printer selector 131 of the printer driver 130 corresponds to the program 153*a*; and printer I/F units 132 to 134 correspond to the network I/F unit 157 and program 153*a*. Herein, the network I/F unit 157 specifies the plurality of printers 201 to 203 connected to a network cable 210 by respective addresses, whereby logically constructing the plurality of printer I/F units 132 to 134.

Figure 3:
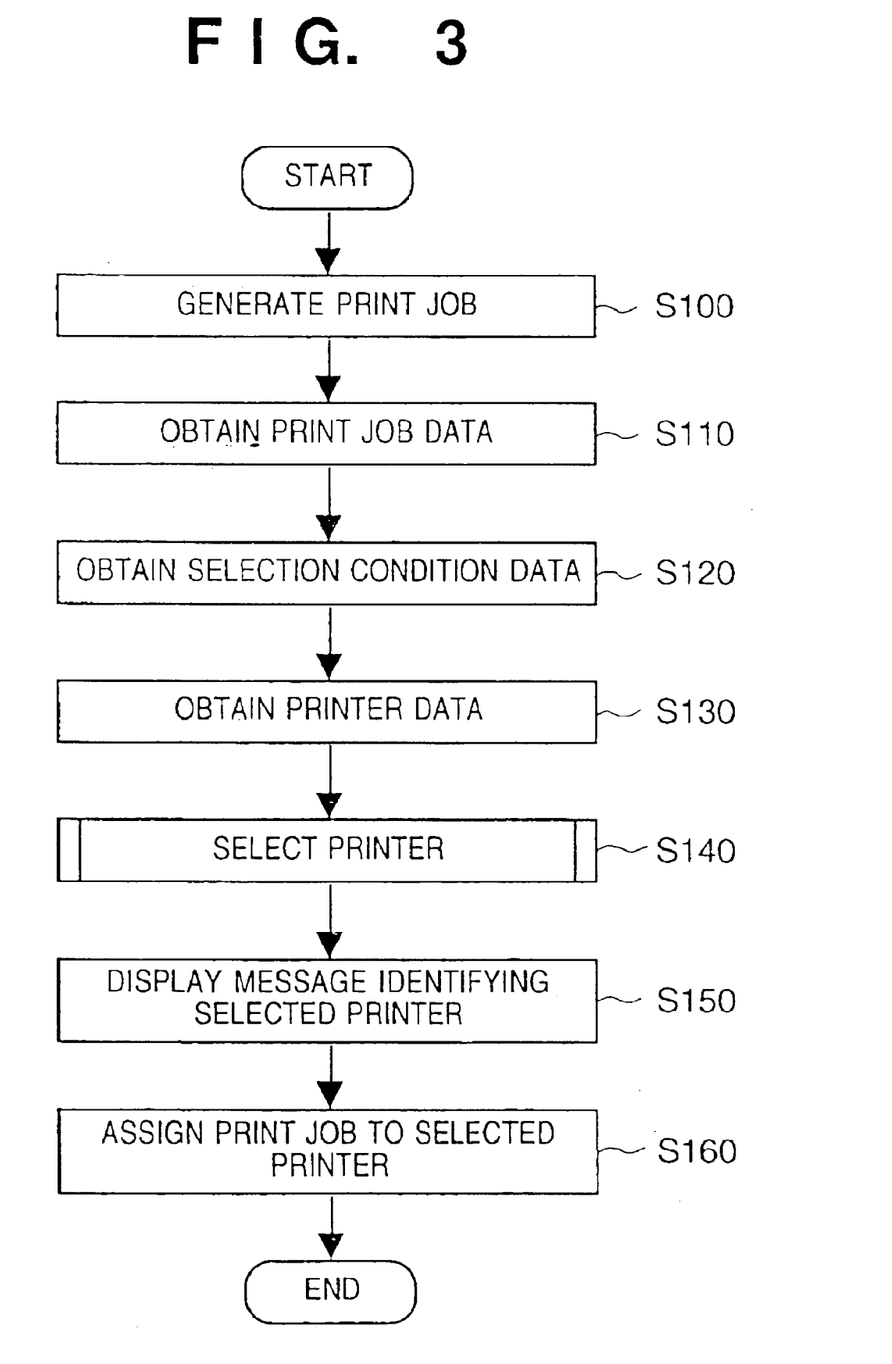
FIG. 3 is a flowchart showing steps of print processing performed based on a program stored in a program memory.

Next, description will be provided on operation related to print processing performed by the computer 100 based on the program 153*a*. FIG. 3 is a flowchart showing the steps of print processing based on the program 153*a*. The print processing is started, for instance, when a print request is issued by an application program (not shown).

First in step S100, a print job is generated based on the print request. More specifically, in this step, print data, e.g., PDL data or the like, corresponding to the resolution, print paper size and so on designated by the application program, is generated. Further, in this step, information considered when the printer driver 130 selects a printer, e.g., the total number of pages of the print job, file size, print paper size and so on, is generated.

In step S110, the print job data generated in step S100 is obtained. More specifically, for instance, the print job data generated in step S100 is copied to a predetermined area (area referred to in step S140) of the RAM 152.

In step S120, selection condition data is obtained from the keyboard/mouse 156. For instance, a message asking an operator to designate a selection condition is displayed on the display unit 155, and data inputted by an operator in response to the displayed message is captured as the selection condition data and stored in the predetermined area of the RAM 152.

Herein, it is preferable to limit the selection conditions, which can be designated by an operator, within such range that at least one of the plurality of printers 201 to 203 satisfies the designated selection condition. By setting such limitation, it is possible to prevent the situation where there is no printer which satisfies the designated selection condition, at the time of selecting a printer in step S140. As the method of setting the limitation to the selection conditions, for instance, it is preferable to display only the selectable conditions on the display unit 155 and allow the operator to select the desired selection condition from the displayed selection conditions.

In step S130, printer data is obtained. For instance, the printer data 131*a* stored in the hard disk 154 is copied to the predetermined area of the RAM 152.

In step S140, a printer for executing the print job is selected, while considering the print job data, selection condition data and printer data stored in the predetermined area of the RAM 152, as well as the state of print job execution as necessary. Note that in step S140, operation states of each of the printers 201 to 203 connected to the network cable 210 are confirmed via the network I/F unit 157, and for instance, if the selected printer is in a state incapable of print operation, it is preferable to set a printer again for executing the print job from the printers other than the selected one.

Meanwhile, there is a case where a plurality of printers satisfy the designated selection condition. To cope with this situation, it is preferable to include the function for selecting one of the printers based on priorities set in advance in the printers 201 to 203, or function which allows an operator to select a desired printer from the plurality of printers when such situation arises.

In step S150, a message is displayed on the display unit 155 to indicate which printer has been selected from the plurality of printers 201 to 203. By displaying the message, the operator is able to recognize the printer automatically selected by the computer 100.

In step S160, the print job generated in step S100 is assigned to the selected printer and the series of processing ends. Note that if the print data needs to be converted to conform to the selected printer, such conversion is performed.

The print job assigned to each printer is executed, for instance, after the preceding print job is completed, and print data is transmitted to the corresponding printer via the network I/F unit 157.

Hereinafter, operation examples of the computer 100 will be described.

OPERATION EXAMPLE 1

Operation Example 1 relates to the processing in step S140 (FIG. 3), performed in a case where the selection condition data obtained in step S120 designates to select a printer which completes execution of the print job in the shortest time period.

Figure 4:
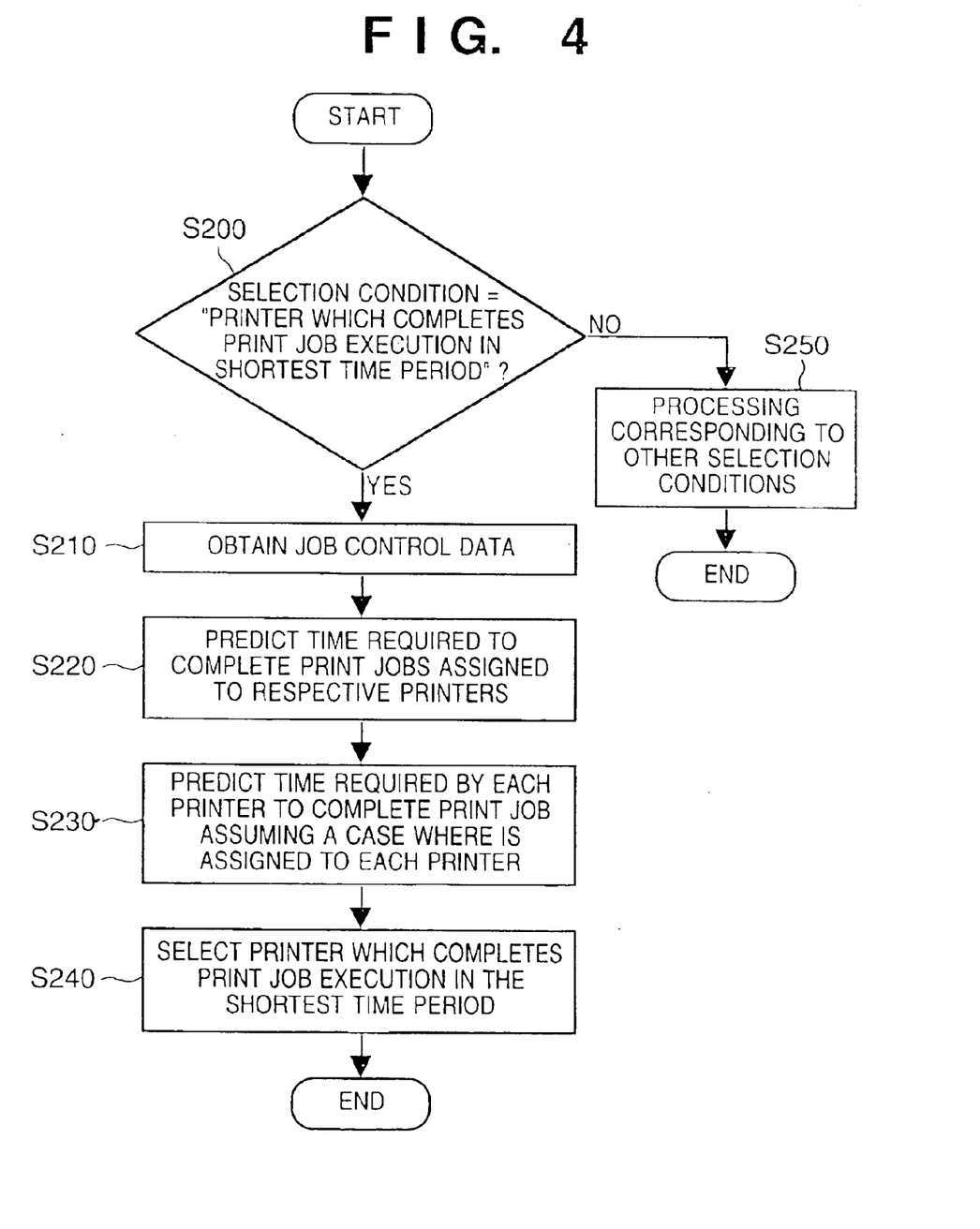
FIG. 4 is a flowchart showing a part of processing contents performed in the selection step of the printer.

FIG. 4 is a flowchart showing a part of specific processing contents performed in step S140.

In step S200, it is determined whether or not the selection condition data, inputted by the operator in step S120, designates a printer which completes the print job execution in the shortest time period. If the result of determination is YES, the processing proceeds to step S210, while if the result is NO, the processing proceeds to step S250.

In step S210, job control data, indicative of progress of the print job assigned to each printer, is obtained. Note that the job control data is controlled by, for instance, another program (e.g., which constitutes a part of the program 153*a*) provided for controlling print jobs.

In the present embodiment, it is assumed that the job control data includes the following information with respect to each of the printers 201 to 203:

remaining number of pages P1 of the print job currently being executed (number of pages not yet outputted)

file size F1 of the remaining print data related to the print job currently being executed (file size of print data not yet transmitted)

total number of pages P2i (i=1 to n) of respective print jobs (1 to n) waiting to be printed file size F2i (i=1 to n) of print data related to respective print jobs (1 to n) waiting to be printed In step S220, time (time T1 required for printing) required to complete print jobs respectively assigned to the printers 201 to 203 is predicted with respect to each printer based on the obtained job control data. The time T1 required for printing can be predicted by, for instance, equation (1) where time required by each printer to print a page is represented by TP (a part of printer data).

$$T1 = P1/TP + \sum_{i=1}^{n}(P2_i/TP) \qquad (1)$$

In step S230, time (time required for printing T2) required by each of the printers to complete the print job generated in step S100 is predicted, assuming a case where the print job generated in step S100 is assigned to each of the printers 201 to 203. The time T2 required for printing can be predicted by, for instance, equation (2) where the total number of pages of the print job is represented by P3.

$$T2 = T1 + P3/TP \qquad (2)$$

Herein, taking into account of the time for transmitting the print data to the printer, above equations (1) and (2) can be substituted with equation (1') and (2') respectively. Assume that R is transmission speed between the network I/F unit 157 and each of the printers, and F3 is a file size of print data related to the print job.

$$T1 = P1/TP + \sum_{i=1}^{n}(P2_i/TP) + F1/R + \sum_{i=1}^{n}(F2_i/R) \qquad (1')$$

$$T2 = T1 + P3/TP + F3/R \qquad (2')$$

In step S240, a printer having the least value T2, calculated with respect to each of the printers 201 to 203, is selected. In other words, a printer which completes the print job execution in the shortest time period is selected.

Figure 5A:
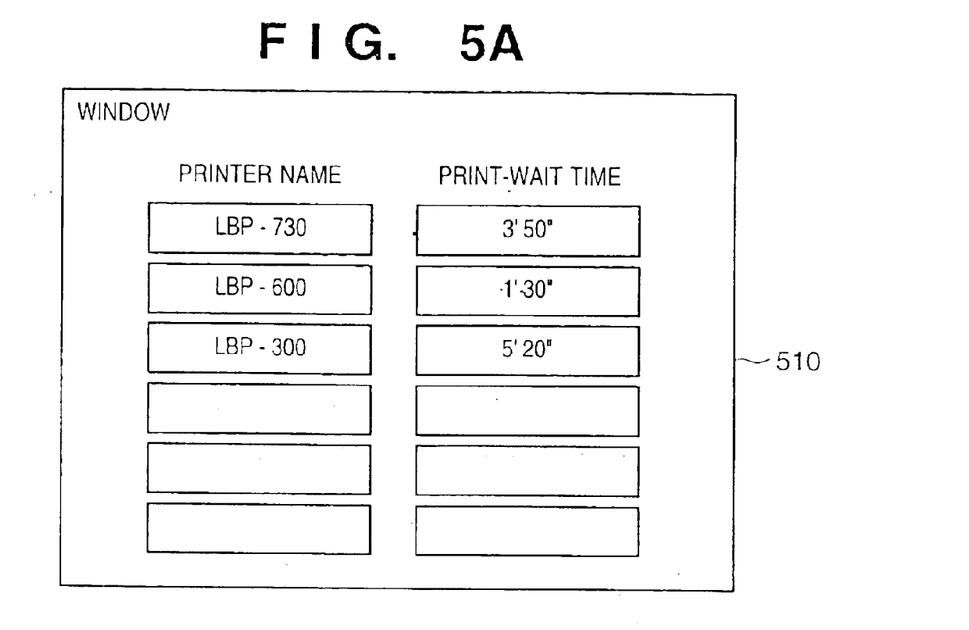
FIGS. 5A and 5B are display examples showing a print-wait time displayed on a display screen of a display unit.
Figure 5B:
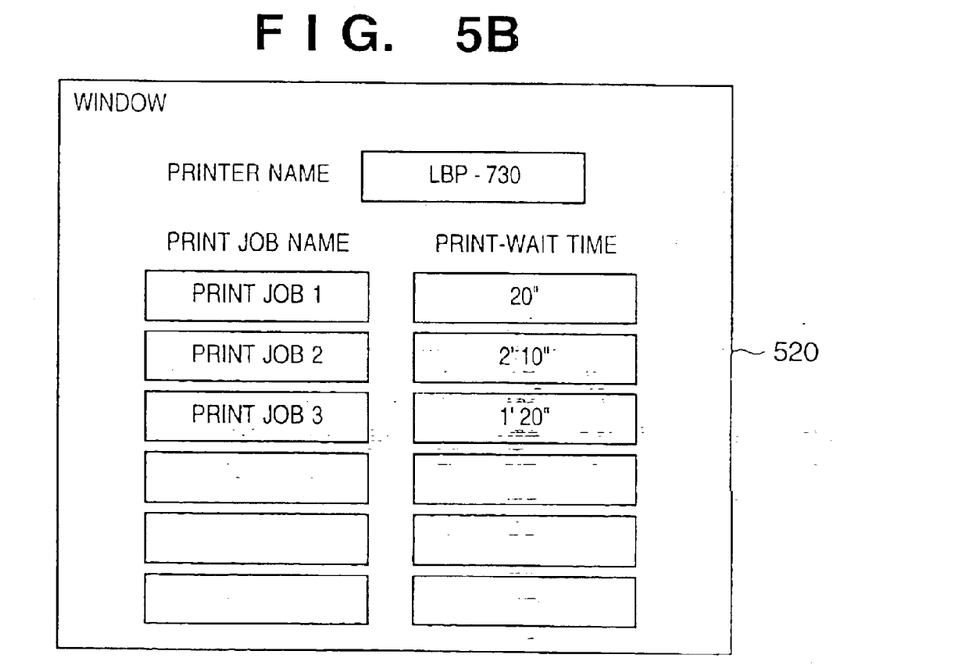

The computer 100 according to the present embodiment has function to provide an operator with time (print-wait time) required to complete execution of print jobs respectively assigned to each of the printers based on the job control data. FIGS. 5A and 5B show examples of a print-wait time displayed on the display screen of the display unit 155.

When the operator instructs to display the print-wait time by using the keyboard/mouse 156, a window 510 is displayed on the display screen of the display unit 155 as shown in FIG. 5A. The example in FIG. 5A shows that the printer named "LBP-730" (e.g., printer 201) has a print-wait time (corresponding to T2) of 3 minutes and 50 seconds.

When the operator selects a desired printer (name of the printer) from the window 510 shown in FIG. 5A, a window 520 (FIG. 5B) showing a list of print-wait time with respect to each of the print jobs assigned to the printer is displayed. FIG. 5B shows an example of the window displayed in a case where the operator selects the "LBP-730" from the window 510 in FIG. 5A. In the example in FIG. 5B, "print job 1" is the print job currently being executed, and the "print-wait time" to complete the print job is 20 seconds (corresponding to P1/TP in equation (1)). "Print job 2" and "print job 3" are in the print-wait state, and time required to complete the print jobs are "2 minutes and 10 seconds" and "1 minute and 20 seconds" respectively (corresponding to $P2_i$/TP in equation (1))

OPERATION EXAMPLE 2

Operation Example 2 relates to print processing performed in a case where the selection condition data obtained in step S120 (FIG. 3) designates to select a printer capable of color printing.

According to the operation example 2, a printer capable of color printing is selected based on the printer data in step S140 in FIG. 3, then a message identifying the selected printer is displayed on the display unit 155 in step S150, and the print job is assigned to the selected printer in step S160.

The processing in step S140 in this case is explained by adapting the flowchart shown in FIG. 4. In step S200, determination is made that the selection condition data does not designate the "printer which completes the print job execution in the shortest time period." Therefore, the processing proceeds to step S250 where a printer satisfying the designated selection condition (printer capable of color printing) is selected.

OPERATION EXAMPLE 3

Operation Example 3 relates to print processing performed in a case where the selection condition data obtained in step S120 (FIG. 3) designates to select a printer capable of both-sides printing.

According to the operation example 3, a printer capable of both-sides printing is selected based on the printer data in step S140 in FIG. 3, then a message identifying the selected printer is displayed on the display unit 155 in step S150, and the print job is assigned to the selected printer in step S160.

The processing in step S140 in this case is explained by adapting the flowchart shown in FIG. 4. In step S200, determination is made that the selection condition data does not designate the "printer which completes the print job execution in the shortest time period." Therefore, the processing proceeds to step S250 where a printer satisfying the designated selection condition (printer capable of both-sides printing) is selected.

OPERATION EXAMPLE 4

Operation Example 4 relates to print processing performed in a case where the selection condition data obtained in step S120 (FIG. 3) designates to select a printer which is capable of using a print paper size conforming to a paper size designated by the print job.

According to the operation example 4, in step S140 in FIG. 3, print paper sizes which can be processed by each of the printers 201 to 203 are confirmed based on the printer data, and a paper size designated by the print job is confirmed. Then, a printer capable of performing print operation using the paper size designated by the print job is selected. Then in step S150, a message identifying the selected printer is displayed on the display unit 155, and in step S160, the print job is assigned to the selected printer.

The processing in step S140 in this case is explained by adapting the flowchart shown in FIG. 4. In step S200, determination is made that the selection condition data does not designate the "printer which completes the print job execution in the shortest time period." Therefore, the processing proceeds to step S250 where a printer satisfying the designated selection condition (printer capable of using a print paper size conforming to a paper size designated by the print job) is selected.

OPERATION EXAMPLE 5

Figure 6:
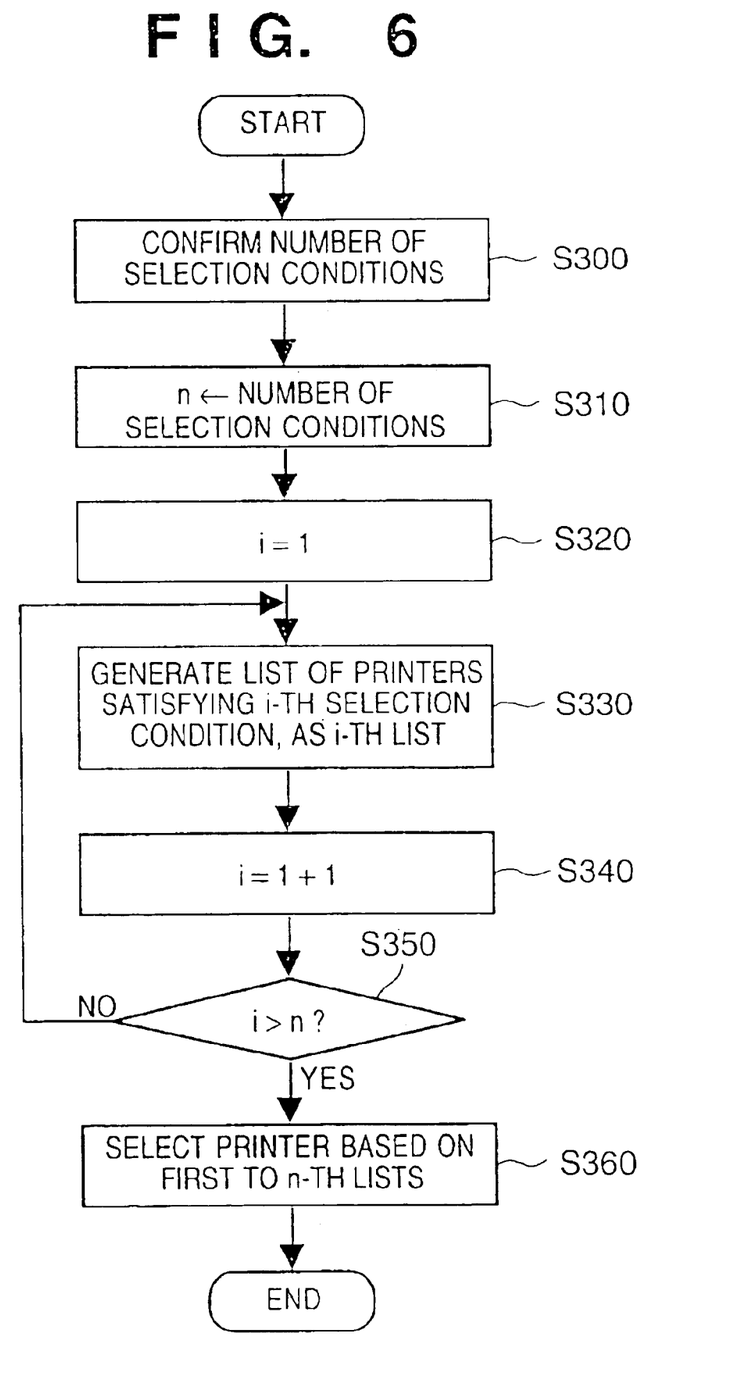
FIG. 6 is a flowchart describing processing contents according to another embodiment, performed in the selection step of the printer.

Operation Example 5 is applicable to a case where an operator designates plural selection conditions. FIG. 6 is a flowchart which describes processing performed in step S140 (FIG. 3) according to the operation example 5.

In step S300, the number of designated selection conditions is confirmed based on the selection condition data obtained in step S120. In step S310, the number of selection conditions is stored as a variable n. In step S320, a parameter i used in the subsequent processing is set to 1 (initializing).

In step S330, a list of printers satisfying the i-th selection condition is generated, as the i-th list, based on the print job data, printer data and so on. The list is generated in the form such as "printer A and Printer B".

In step S340, the parameter i is incremented by 1, and in step S350, the value of parameter i is compared with the value of variable n in order to determine whether or not generation of the n-th list has been completed. If it is not completed, the processing returns to step S330, while if it is completed, the processing proceeds to step S360. In other words, by executing the processing of steps S330 to S350, the first to n-th lists are generated.

In step S360, a printer satisfying all of the first to n-th selection conditions is selected based on the first to n-th lists. Herein, in a case where there are plural printers satisfying the designated selection conditions, one of the printers is selected based on, for instance, predetermined priorities and the like.

As has been set forth above, according to the present invention, a printer which satisfies the selection condition designated by an operator is automatically selected. Therefore, cumbersome operation by the operator is largely reduced.

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

According to the present invention, it is possible to realize automatic selection of an image output apparatus suitable to contents of an image output job. By this, cumbersome operation performed by an operator is reduced.

The present invention is not limited to the above embodiments and various changes and modifications can be made within the spirit and scope of the present invention. Therefore, to appraise the public of the scope of the present invention, the following claims are made.

What is claimed is:

1. A data processing apparatus having a printer driver for generating print data in accordance with a print request issued by an application program assigning the generated print data to one of a plurality of image output apparatuses and that communicates with the plurality of image output apparatuses via a network, said data processing apparatus comprising:

limiting means for limiting selection conditions of functions provided by the plurality of image output apparatuses, which are associated with printing and capable of being designated by an operator, within a range so defined that at least one of the plurality of image output apparatuses satisfies a selection condition that can be designated by the operator among the limited selection conditions, the range being represented by a sum of the functions provided by each respective one of the plurality of image output apparatuses on the network;

control means for controlling a display device to display the selection conditions limited by said limiting means in a form such that the operator can designate a desired selection condition;

generating means for generating a plurality of lists in a case where a plurality of selection conditions are designated by the operator, the plurality of lists respectively corresponding to the plurality of designated selection conditions and each of the lists including one or more image output apparatuses satisfying the corresponding selection condition;

selecting means for selecting an image output apparatus satisfying the plurality of designated selection conditions based on the plurality of lists generated by said generating means; and constructing means for constructing, within the data processing apparatus, a plurality of logical interfaces, for transmitting the print data directly to one of the plurality of image output apparatuses via the network, each of the plurality of logical interfaces respectively corresponding to the plurality of image output apparatuses, wherein the generated print data is assigned to one of the plurality of image output apparatuses that is selected based on a selection condition designated by the operator and information which is stored in advance and which indicates print functions of the plurality of image output apparatuses.

2. The data processing apparatus according to claim 1, further comprising:

message display means for displaying a message asking the operator to designate a desired selection condition;

acquiring means for acquiring job control data from each of the plurality of image output apparatuses in a case where a selection condition designated by the operator designates to select an image output apparatus which completes an assigned print job in a shortest time;

predicting means for predicting, for each of the plurality of image output apparatuses, a time required to complete a print job assigned thereto;

selecting means for selecting an image output apparatus which will complete an assigned print job in a shortest time based on the prediction result obtained by the predicting means; and window generating means for generating a window showing a list of print-wait times with respect to each print job which has been assigned to the image output apparatus selected by the selecting means.

3. The data processing apparatus according to claim 1, further comprising:

assigning means for assigning a print job, including the print data, to one of the plurality of image output apparatuses based on the selection condition designated by the operator;

converting means for converting the print data to conform to the image output apparatus to which the print job is assigned by said assigning means; and transmitting means for transmitting the print data converted by said converting means to the image output apparatus through the logical interface corresponding to the assigned image output apparatus constructed by said constructing means.

4. The apparatus according to claim 1, further comprising selecting means for selecting one of the plurality of image output apparatuses based on priorities set in advance in the plurality of image output apparatuses in a case where a plurality of image output apparatuses satisfy the selection condition designated by the operator.

5. A data processing method for a data processing apparatus having a printer driver for generating print data in accordance with a print request issued by an application program assigning the generated print data to one of a plurality of image output apparatuses and that communicates with the plurality of image output apparatuses via a network, said data processing method comprising the steps of:

limiting selection conditions of functions provided by the plurality of image output apparatuses, which are associated with printing and capable of being designated by an operator, within a range so defined that at least one of the plurality of image output apparatuses satisfies a selection condition that can be designated by the operator among the limited selection conditions, the range being represented by a sum of the functions provided by each respective one of plurality of image output apparatuses on the network;

controlling a display device to display the selection conditions limited by said limiting step in a form such that the operator can designate a desired selection condition;

generating a plurality of lists in a case where a plurality of selection conditions are designated by the operator, the plurality of lists respectively corresponding to the plurality of designated selection conditions and each of the lists including one or more image output apparatuses satisfying the corresponding selection condition;

selecting an image output apparatus satisfying the plurality of designated selection conditions based on the plurality of lists generated by said generating step; and constructing, within the data processing apparatus, a plurality of logical interfaces, for transmitting the print data directly to one of the plurality of image output apparatuses via the network, each of the plurality of logical interfaces respectively corresponding to the plurality of image output apparatuses, wherein the generated print data is assigned to one of the plurality of image output apparatuses that is selected based on a selection condition designated by the operator and information which is stored in advance and which indicates print functions of the plurality of image output apparatuses.

6. The data processing method according to claim 5, further comprising the steps of:

displaying a message asking the operator to designate a desired selection condition;

acquiring job control data from each of the plurality of image output apparatuses in a case where a selection condition designated by the operator designates to select an image output apparatus which completes an assigned print job in a shortest time;

predicting, for each of the plurality of image output apparatuses, a time required to complete a print job assigned thereto;

selecting an image output apparatus which will complete an assigned print job in a shortest time based on the prediction result obtained by the predicting step; and generating a window showing a list of print-wait times with respect to each print job which has been assigned to the image output apparatus selected by the selecting step.

7. The data processing method according to claim 5, further comprising the steps of:

assigning a print job, including the print data, to one of the plurality of image output apparatuses based on the selection condition designated by the operator;

converting the print data to conform to the image output apparatus to which the print job is assigned by said assigning step; and transmitting the print data converted by said converting step to the image output apparatus through the logical interface corresponding to the assigned image output apparatus constructed by said constructing step.

8. The method according to claim 5, further comprising the step of selecting one of the plurality of image output apparatuses based on priorities set in advance in the plurality of image output apparatuses in a case where a plurality of image output apparatuses satisfy the selection condition designated by the operator.

9. A memory medium storing computer-executable process steps for a data processing method of a data processing apparatus having a printer driver for generating print data in accordance with a print request issued by an application program assigning the generated print data to one of a plurality of image output apparatuses and that communicates with the plurality of image output apparatuses via a network, said computer-executable process steps comprising the steps of:

limiting selection conditions of functions provided by the plurality of image output apparatuses, which are associated with printing and capable of being designated by an operator, within a range so defined that at least one of the plurality of image output apparatuses satisfies a selection condition that can be designated by the operator among the limited selection conditions, the range being represented by a sum of the functions provided by each respective one of plurality of image output apparatuses on the network;

controlling a display device to display the selection conditions limited by said limiting step in a form such that the operator can designate a desired selection condition;

generating a plurality of lists in a case where a plurality of selection conditions are designated by the operator, the plurality of lists respectively corresponding to the plurality of designated selection conditions and each of the lists including one or more image output apparatuses satisfying the corresponding selection condition;

selecting an image output apparatus satisfying the plurality of designated selection conditions based on the plurality of lists generated by said generating step; and constructing, within the data processing apparatus, a plurality of logical interfaces, for transmitting the print data directly to one of the plurality of image output apparatuses via the network, each of the plurality of logical interfaces respectively corresponding to the plurality of image output apparatuses, wherein the generated print data is assigned to one of the plurality of image output apparatuses that is selected based on a selection condition designated by the operator and information which is stored in advance and which indicates print functions of the plurality of image output apparatuses.

10. The memory medium according to claim 9, wherein the computer-executable process steps further comprise the steps of:

displaying a message asking the operator to designate a desired selection condition;

acquiring job control data from each of the plurality of image output apparatuses in a case where a selection condition designated by the operator designates to select an image output apparatus which completes an assigned print job in a shortest time;

predicting, for each of the plurality of image output apparatuses, a time required to complete a print job assigned thereto;

selecting an image output apparatus which will complete an assigned print job in a shortest time based on the prediction result obtained by the predicting step; and generating a window showing a list of print-wait times with respect to each print job which has been assigned to the image output apparatus selected by the selecting step.

11. The memory medium according to claim 9, wherein the computer-executable process steps further comprise the steps of:

assigning a print job, including the print data, to one of the plurality of image output apparatuses based on the selection condition designated by the operator;

converting the print data to conform to the image output apparatus to which the print job is assigned by said assigning step; and transmitting the print data converted by said converting step to the image output apparatus through the logical interface corresponding to the assigned image output apparatus constructed by said constructing step.

12. The memory medium according to claim 9, wherein said process steps further comprise the step of selecting one of the plurality of image output apparatuses based on priorities set in advance in the plurality of image output apparatuses in a case where a plurality of image output apparatuses satisfy the selection condition designated by the operator.

* * * * *

UNITED STATES PATENT AND TRADEMARK OFFICE
CERTIFICATE OF CORRECTION

PATENT NO. : 6,888,641 B2 Page 1 of 1
APPLICATION NO. : 09/088737
DATED : May 3, 2005
INVENTOR(S) : Koana It is certified that error appears in the above-identified patent and that said Letters Patent is hereby corrected as shown below:

ON THE TITLE PAGE (75) Inventor: "Ryuzou Koana" should read --Ryuzo Koana--.

COLUMN 7
Line 13, "($P2,/TP$)" should read --($P2_i/TP$)--; and
Line 34, "($P2,/TP$)" should read --($P2_i/TP$)-- and "($F2,/R$)" should read --($F2_i/R$)--.

COLUMN 10
Line 10, "appraise" should read --apprise--.

COLUMN 11
Line 48, "plurality" should read --the plurality--.

COLUMN 12
Line 62, "plurality" should read --the plurality--.

Signed and Sealed this

Fourteenth Day of November, 2006

JON W. DUDAS
*Director of the United States Patent and Trademark Office*